US010133624B2

(12) United States Patent
Lee et al.

(10) Patent No.: US 10,133,624 B2
(45) Date of Patent: Nov. 20, 2018

(54) FAULT LOCALIZATION AND ERROR CORRECTION METHOD FOR SELF-CHECKING BINARY SIGNED-DIGIT ADDER AND DIGITAL LOGIC CIRCUIT FOR THE METHOD

(71) Applicant: INDUSTRY-ACADEMIC COOPERATION FOUNDATION CHOSUN UNIVERSITY, Gwangju (KR)

(72) Inventors: Jeong A Lee, Gwangju (KR); Hossein Moradian, Gwangju (KR)

(73) Assignee: INDUSTRY-ACADEMIC COOPERATION FOUNDATION CHOSUN UNIVERSITY, Gwangju (KR)

( * ) Notice: Subject to any disclaimer, the term of this patent is extended or adjusted under 35 U.S.C. 154(b) by 105 days.

(21) Appl. No.: 15/247,185

(22) Filed: Aug. 25, 2016

(65) Prior Publication Data

US 2017/0063403 A1    Mar. 2, 2017

(30) Foreign Application Priority Data

Aug. 25, 2015 (KR) .......................... 10-2015-0119844

(51) Int. Cl.
*G06F 11/30* (2006.01)
*G08C 25/00* (2006.01)
*H03M 13/00* (2006.01)
*G06F 11/10* (2006.01)

(52) U.S. Cl.
CPC ................... *G06F 11/10* (2013.01)

(58) Field of Classification Search
CPC ....................................................... G06F 11/10
See application file for complete search history.

(56) References Cited

U.S. PATENT DOCUMENTS 5,450,340 A * 9/1995 Nicolaidis ............. G06F 11/085
708/531

FOREIGN PATENT DOCUMENTS

| KR | 10-2008-0074448 A | 8/2008 |
| KR | 10-1268997 B1 | 5/2013 |
| KR | 10-2015-0021696 A | 3/2015 |

OTHER PUBLICATIONS

Alavi et al. "Fault Localization and Full Error Correction in Radix2 Signed Digit-Based Adders;" IEEE, 2007, pp. 214-218.*
Avizienis, Algirdas, "Signed-digit numbe representations for fast parallel arithmetic," Electronic Computers, IRE Transactions, pp. 389-400, 1961.

(Continued)

*Primary Examiner* — Guy Lamarre
(74) *Attorney, Agent, or Firm* — The PL Law Group, PLLC

(57) ABSTRACT

Disclosed are a fault-localization and error-correction method for a self-checking binary signed-digit adder and a digital logic circuit for performing the method. More specifically, a fault-localization and error-correction method for a self-checking binary signed-digit adder in which a stuck-at fault of the self-checking binary signed-digit adder may be detected at low cost and with low complexity and in which an error may be autonomously corrected using the self-dual concept, and a digital logic circuit for performing the method are disclosed.

8 Claims, 6 Drawing Sheets

(56) References Cited

OTHER PUBLICATIONS

G. C. Cardarili et al., "Localization of faults in radix-n signed digit adders," 12th IEEE International On-Line Testing Symposium, 2006.
G. C. Cardarili et al., "Error detection in signed digit arithmetic circuit with parity checker [adder example]," Defect and Fault Tolerance in VLSI Systems, pp. 1-8, 2003.

* cited by examiner

| $a_i, b_i$ | Previous digit position(i−1) | $t_i$ | $w_i$ |
|---|---|---|---|
| 0, 0 | – | 0 | 0 |
| −1, −1 | – | −1 | 0 |
| 1, 1 | – | 1 | 0 |
| −1, 1 | – | 0 | 0 |
| −1, 0 | $(a_{i-1} + b_{i-1}) < 0$ | −1 | 1 |
| | Otherwise | 0 | −1 |
| 1, 0 | $(a_{i-1} + b_{i-1}) > 0$ | 1 | −1 |
| | Otherwise | 0 | 1 |

FIG. 3

| $a_i$ | $\overline{a_i}$ |
|---|---|
| 01 (+1) | 10 (−1) |
| 10 (−1) | 01 (+1) |
| 00 (0) | 11 (0) |
| 11 (0) | 00 (0) |

FIG. 4

| $a_i, b_i$ | $t_i$ | $w_i$ | $\overline{a_i}, \overline{b_i}$ | $\overline{t_i}$ | $\overline{w_i}$ |
|---|---|---|---|---|---|
| 0, 0 | 0 | 0 | 0, 0 | 0 | 0 |
| −1, −1 | −1 | 0 | 1, 1 | 1 | 0 |
| 1, 1 | 1 | 0 | −1, −1 | −1 | 0 |
| −1, 1 | 0 | 0 | 1, −1 | 0 | 0 |

FIG. 5

| $a_i, b_i$ | Previous digit position $(i-1)$ $a_{i-1}, b_{i-1}$ | | $t_i$ | $w_i$ |
|---|---|---|---|---|
| −1, 0 | $(a_{i-1} + b_{i-1}) < 0$ | 0, −1<br>−1, −1 | −1 | 1 |
| | Otherwise | 0, 0<br>0, 1<br>1, 1<br>1, −1 | 0 | −1 |
| 1, 0 | $(a_{i-1} + b_{i-1}) > 0$ | 0, 1<br>1, 1 | 1 | −1 |
| | Otherwise | 0, 0<br>0, −1<br>−1, −1<br>1, −1 | 0 | 1 |

| $\overline{a_i}, \overline{b_i}$ | Previous digit position $(i-1)$ $\overline{a_{i-1}}, \overline{b_{i-1}}$ | | $t_i$ | $w_i$ |
|---|---|---|---|---|
| 1, 0 | $(\overline{a_{i-1}} + \overline{b_{i-1}}) > 0$ | 0, 1<br>1, 1 | 1 | −1 |
| | | 0, 0<br>0, −1<br>−1, −1<br>−1, 1 | 0 | 1 |
| −1, 0 | $(\overline{a_{i-1}} + \overline{b_{i-1}}) < 0$ | 0, −1<br>−1, −1 | −1 | 1 |
| | | 0, 0<br>0, 1<br>1, 1<br>−1, 1 | 0 | −1 |

FIG. 6

| $t_i, w_i$ | $s_i$ | $\overline{t_i}, \overline{w_i}$ | $\overline{s_i}$ |
|---|---|---|---|
| 0, 0 | 0 | 0, 0 | 0 |
| 0, 1 | 1 | 0, -1 | -1 |
| 0, -1 | -1 | 0, 1 | 1 |
| 1, -1 | 0 | -1, 1 | 0 |

FAULT LOCALIZATION AND ERROR CORRECTION METHOD FOR SELF-CHECKING BINARY SIGNED-DIGIT ADDER AND DIGITAL LOGIC CIRCUIT FOR THE METHOD

BACKGROUND

Field of the Invention

The present invention generally relates to a fault-localization and error-correction method for a self-checking binary signed-digit adder and a digital logic circuit for performing the method. More particularly, the present invention relates to a fault-localization and error-correction method for a self-checking binary signed-digit adder, by which a stuck-at fault of the self-checking binary signed-digit adder may be detected at low cost and with low complexity and by which an error may be autonomously corrected using a self-dual concept, and to a digital logic circuit for performing the method.

Description of the Related Art

In an arithmetic operation, signed-digit representation aims to eliminate the propagation of carries.

In the Binary Signed-Digit Number (BSDN) system proposed by Cardarilli et al, the binary signed-digit number 'a' may be represented as the following Equation (1):

$$a = \sum_{i=1}^{n-1} x_i 2^i \quad (1)$$

where $x_i \in \{-1, 0, 1\}$, and n denotes the number of digits.

First, in order to calculate the addition of signed-digit numbers, it is necessary to calculate an intermediate sum and an intermediate carry. Here, the intermediate sum and the intermediate carry are calculated using the computation rule shown in FIG. 1, and this may be represented using the following Equation (2):

$$a_i + b_i = 2t_{i+1} + w_i \quad (2)$$

where a denotes an addend, b denotes an augend, t denotes an intermediate carry, and w denotes an intermediate sum.

Also, referring to FIG. 1, when a pair comprising the addend $a_i$ and the augend $b_i$ is (0, 0), (−1, −1), (1, 1) or (−1, 1), the intermediate carry and the intermediate sum are calculated as (0, 0), (−1, 0), (1, 0), or (0, 0), respectively, without using the number of a previous digit position (i −1).

However, under the condition in which a pair comprising the addend $a_i$ and the augend $b_i$ is (−1, 0), if the sum of the addend $a_{i-1}$ and the augend $b_{i-1}$ at a previous digit position is less than '0', the intermediate carry and the intermediate sum become (−1, 1), but if not, they become (0, −1). Also, under the condition in which a pair comprising the addend $a_i$ and the augend $b_i$ is (1, 0), if the sum of the addend $a_{i-1}$ and the augend $b_{i-1}$ at the previous digit position is greater than '0', the intermediate carry and the intermediate sum become (1, −1), but if not, they become (0, 1).

Meanwhile, Cardarilli et al. proposed a self-checking binary signed-digit adder using a parity checker in order to detect a stuck-at fault.

FIG. 2 shows Cardarilli's self-checking binary signed-digit adder. This adder 10 includes an adder unit 11 for outputting a result 'z' by adding an addend 'a' and an augend 'b' and an error indicator unit 12 for detecting a computational error of the adder unit 11.

Also, the adder unit 11 includes multiple first adders ADD1s for calculating the addition of an addend $a_i$ and an augend $b_i$ using an intermediate carry $t_i$ and an intermediate sum $w_i$ based on the computation rule shown in FIG. 1, and multiple second adders ADD2s arranged so as to correspond to respective first adders ADD1s. Here, each of the second adders serves to output a final result by adding the intermediate sum $w_i$ from the corresponding first adder and the intermediate carry $t_{i-1}$ from the first adder, having calculated the value of the previous digit.

Also, the error indicator unit 12 includes a parity predictor 12a for predicting parity by receiving an addend and an augend, a first XOR gate 12b for outputting the parity of a result of an XOR operation that is performed on the parity of the addend and the parity of the augend, a first error indicator 12c for receiving the output of the first XOR gate 12b and the intermediate sums of the first adders ADD1s and for detecting an error by performing an XOR operation on the received values, a second XOR gate 12d for receiving the output values of the second adders ADD2s and outputting the parity of a result of an XOR operation performed on the received values, and a second error indicator 12f for receiving the parity output from the parity predictor 12a, the parity output from the first XOR gate 12b, and the parity output from the second XOR gate 12d and for detecting an error by performing an XOR operation on the received values.

Meanwhile, according to the method proposed by Cardarilli et al., when an error is detected in the error indicator unit 12, the bits of the initially input addend and augend are shifted to the left and right, and recomputation is performed on the shifted input. Then, the result of the initial computation is compared with the result of the recomputation, whereby a stuck-at fault is detected. However, this method is disadvantageous in that cost and complexity are increased in the detection of the stuck-at fault and error correction.

DOCUMENTS OF RELATED ART (Non-Patent Document 1) Avizienis, Algirdas, "Signed-digit number representations for fast parallel arithmetic," Electronic Computers, IRE Transactions, pp. 389-400, 1961;

(Non-Patent Document 2) G. C. Cardarilli, M. Ottavi, S. Pontarelli, M. Re and A. Salsano, "Localization of faults in radix-n signed digit adders," On-Line Testing Symposium, 2006; and (Non-Patent Document 3) G. C. Cardarilli, M. Ottavi, S. Pontarelli, M. Re and A. Salsano, "Error detection in signed digit arithmetic circuit with parity checker [adder example]," Defect and Fault Tolerance in VLSI systems, pp. 401-8, 2003.

SUMMARY

Accordingly, the present invention has been made keeping in mind the above problems, and an object of the present invention is to provide a fault-localization and error-correction method, through which the detection of a stuck-at fault of a self-checking binary signed-digit adder and error correction therefor may be performed at low cost and with low complexity, and a digital logic circuit for performing the method.

The objects of the present invention are not limited to the above-mentioned object, and other objects that have not been mentioned may be clearly understood by those skilled in the art from the following description.

In order to achieve the above object, the present invention provides a fault-localization and error-correction method for a self-checking binary signed-digit adder that is configured to receive an addend and an augend, which are signed-digit numbers, as input values, to perform an addition operation on the input values, and to output an error signal when an error occurs in the addition operation, the fault-localization and error-correction method including detecting the error signal in the self-checking binary signed-digit adder; inputting a value (hereinafter, referred to as 'inverted inputs') acquired by computing a 1's complement of an input value (hereinafter, referred to as 'normal inputs') of the operation in which the error occurs to the self-checking binary signed-digit adder and performing recomputation on the inverted inputs; and determining whether an error signal is detected in the self-checking binary signed-digit adder after the recomputation, and performing fault localization and error correction depending on whether the error signal is detected.

In a preferred embodiment, the fault-localization and error-correction method may further include outputting a 1's complement of a result of the operation performed on the inverted inputs as a result of the operation performed on the normal inputs when no error signal is detected after the recomputation.

In a preferred embodiment, the self-checking binary signed-digit adder may include an adder unit for performing an addition operation and an error indicator unit for detecting an error of the addition operation, and the fault-localization and error-correction method may further include determining whether a fault occurs in the adder unit or in the error indication unit when the error signal is detected after the recomputation.

In a preferred embodiment, the determining whether the fault occurs may include comparing bits of a result (hereinafter, referred to as 'faulty output') of the operation performed on the normal inputs with corresponding bits of a result (hereinafter, referred to as 'output for the inverted inputs') of the operation performed on the inverted inputs; and determining that one or more faults occur in the adder unit or in the error indicator unit when an identical bit is found to be present as a result of the comparing, and determining that a fault occurs in the error indicator unit when an identical bit is not found to be present as the result of the comparing.

In a preferred embodiment, when no error signal is detected after the recomputation, the fault-localization and error-correction method may further include determining a location at which a fault occurs in the adder unit depending on a number of identical bits found as a result of the comparing the bits of the faulty output with corresponding bits of the output for the inverted inputs.

In a preferred embodiment, the adder unit may include multiple first adders and multiple second adders arranged so as to correspond to the respective first adders, each of the first adders outputting a sum and a carry by adding a signed-digit of the addend and a signed-digit of the augend at an identical digit position, and each of the second adders outputting a final addition result of the addend and the augend by adding the sum output from the corresponding first adder and the carry output from the first adder, having added the signed-digit of the addend and the signed-digit of the augend at a previous digit position, and the determining whether the fault occurs may be configured such that when one identical bit is found as the result of the comparing the bits of the faulty output with the corresponding bits of the output for the inverted inputs, it is determined that the fault occurs in any one of outputs of the second adders, in any one of outputs of the first adders causing a change of one bit in the final addition result, in an LSB of any one of inputs of the first adders causing a change of two bits in the final addition result, or in an MSB of any one of the inputs of the first adders causing a change of three bits in the final addition result.

In a preferred embodiment, the determining whether the fault occurs may be configured such that when two identical bits are found as the result of the comparing the bits of the faulty output with the corresponding bits of the output for the inverted inputs, it is determined that the fault occurs in the LSB of any one of the inputs of the first adders causing a change of two bits in the final addition result or in the MSB of any one of the inputs of the first adders causing a change of three bits in the final addition result.

In a preferred embodiment, the determining whether the fault occurs may be configured such that when three identical bits are found as the result of the comparing the bits of the faulty output with the corresponding bits of the output for the inverted inputs, it is determined that the fault occurs in the MSB of any one of the inputs of the first adders causing a change of three bits in the final addition result.

Also, the present invention further provides a digital logic circuit for performing the fault-localization and error-correction method.

BRIEF DESCRIPTION OF THE DRAWINGS

The above and other objects, features and other advantages of the present invention will be more clearly understood from the following detailed description when taken in conjunction with the accompanying drawings, in which:

FIGS. 3 to 6 are views for describing the self-dual concept of a fault-localization and error-correction method according to an embodiment of the present invention;

DETAILED DESCRIPTION

Figures 1, 2:
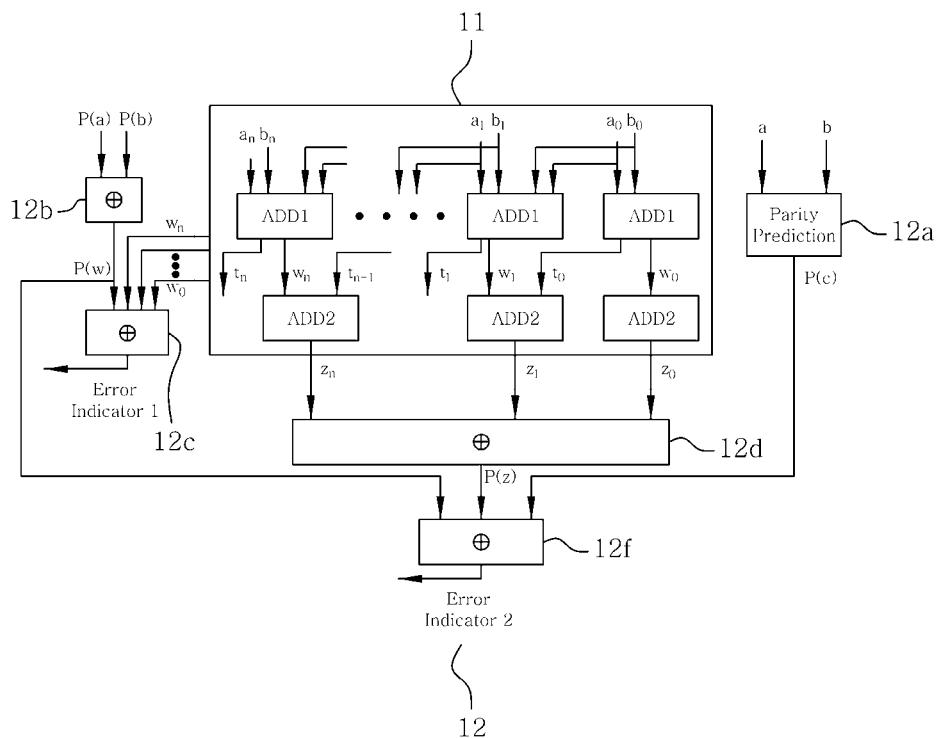
FIG. 1 is a view describing a computation rule for addition of general binary signed-digit numbers.
FIG. 2 is a view that shows Cardarilli's self-checking binary signed-digit adder.

As terms used in the present invention, general terms that are widely used at present are selected, but terms arbitrarily selected by the applicant may be used for particular cases. In this case, these terms should be interpreted not based on the titles of the terms but based on the meaning described or used in the detailed description for the implementation of the invention.

Hereinafter, the technical configuration of the present invention will be described in detail with reference to preferred embodiments illustrated in the accompanying drawings.

However, the present invention is not limited to the embodiments described herein, and may be embodied in a different form. Throughout the specification, the same reference numerals will refer to the same or like parts.

A fault-localization and error-correction method according to an embodiment of the present invention is a method configured such that when an error occurs in the self-checking binary signed-digit adder 10 shown in FIG. 2, the location at which a stuck-at fault occurs is detected and the result of the operation is corrected, whereby the error may be corrected by itself.

Also, a fault-localization and error-correction method according to an embodiment of the present invention may be performed through a digital logic circuit, and the digital logic circuit may be implemented in hardware.

For example, the fault-localization and error-correction method of the present invention may be performed through a processor system, an embedded system or the like, which has a digital logic circuit for performing the fault-localization and error-correction method of the present invention.

However, the fault-localization and error-correction method of the present invention may be applied to all forms of computing devices that have a function of adding signed numbers.

Also, the present invention may be provided as a single self-repairing adder in which the digital logic circuit and the self-checking binary signed-digit adder are combined.

The fault-localization and error-correction method according to an embodiment of the present invention is based on the self-dual concept.

Here, "self-dual" means the case in which a certain logic function satisfies the following Equation (3):

$$f(x)=\sim f(\sim x) \qquad (3)$$

where x denotes a vector of logic variables, ~x denotes a 1's complement of x, and f denotes a logic function.

Also, in order to satisfy the self-dual property in the addition of binary signed-digit numbers, when the sum 's' of an addend 'a' and an augend 'b' is represented as 's=a+b', the sum of the inversion of the addend 'a' and the inversion of the augend 'b' must become the inversion of the sum 's'; that is, the equation $\bar{s}=\bar{a}+\bar{b}$ must be satisfied.

In the present invention, in order to apply the self-dual concept, the signed digit '+1' is coded to the two bits '01', the signed digit '−1' is coded to the two bits '10', and '0' is coded to the two bits '00' or '11', as shown in FIG. 3.

For example, when the binary signed-digit number 'a' is $10\bar{1}10\bar{1}10$, the binary signed-digit number 'a' is the same as the decimal number 106.

Here, the inversion of the binary signed-digit number 'a' becomes $\bar{1}01\bar{1}0110$, which is the same as the decimal number −106. That is, the value is the same but the sign is inverted from positive to negative or vice versa.

Also, because the binary singed-digit '0' is coded to '00' or '11', even if it is inverted, it becomes '0'.

FIG. 4 shows whether an intermediate sum $w_i$ and an intermediate carry $t_i$ satisfy the self-dual property when a pair comprising an addend $a_i$ and an augend $b_i$ is (0, 0), (−1, −1), (1, 1) or (−1, 1), as shown in the first four rows in the computation rule of FIG. 1. Here, when the addend and the augend are inverted, the intermediate sum and the intermediate carry are also inverted, whereby it is confirmed that the self-dual property is satisfied.

Also, FIG. 5 shows whether an intermediate sum $w_i$ and an intermediate carry $t_i$ satisfy the self-dual property when a pair comprising an addend $a_i$ and an augend $b_i$ is (−1, 0) or (1, 0), as shown in the last two rows in the computation rule of FIG. 1. Here, when the addend and the augend are inverted, the intermediate sum and the intermediate carry are also inverted, whereby it is confirmed that the self-dual property is satisfied.

Finally, FIG. 6 show whether the operation of the second adders ADD2s, illustrated in FIG. 2, satisfies the self-dual property. Here, when an intermediate sum $w_i$ and an intermediate carry $t_i$ are inverted, because a result of the operation $s_i$ (marked with z in FIG. 2) is inverted, it is confirmed that this case also satisfies the self-dual property.

Consequently, when a binary signed-digit number is coded as shown in FIG. 3, the operation in the self-checking binary signed-digit adder satisfies the self-dual property.

Figure 7:
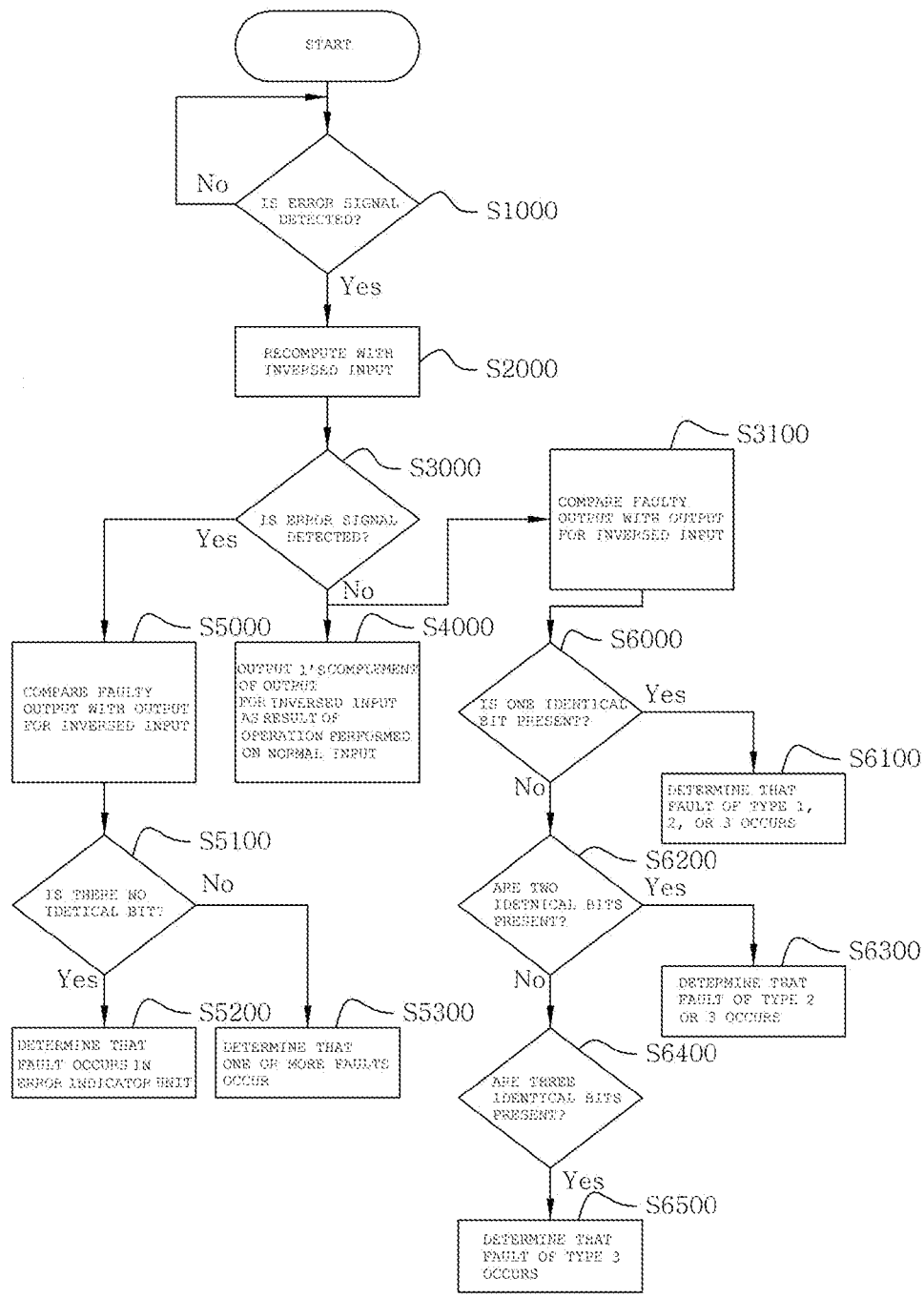
FIG. 7 is a flowchart of a fault-localization and error-correction method according to an embodiment of the present invention.

FIG. 7 shows a flowchart of a fault-localization and error-correction method according to an embodiment of the present invention. In the fault-localization and error-correction method according to an embodiment of the present invention, first, whether an error signal is output from the self-checking binary signed-digit adder 10 is monitored. When an error signal is detected at step S1000, a value acquired by computing 1's complements of the respective bits of the value that is input when the error occurred (hereinafter, referred to as 'normal inputs'), that is, the inversion of the normal inputs (hereinafter, referred to as 'inverted inputs'), is input again to the self-checking binary signed-digit adder 10 and is then recomputed at step S2000.

Here, the error signal may be output from the first error indicator 12c or the second error indicator 12f, illustrated in FIG. 2.

Next, after the recomputation, whether an error signal is detected is monitored, and depending on whether the error signal is detected, fault localization or error correction is performed at step S3000.

If no error signal is detected after the recomputation, the result of the operation performed on the inverted inputs is inverted again, and the inversion of the result is output as the result of the operation performed on the normal inputs.

This is possible because the operation of the self-checking binary signed-digit adder 10 satisfies the self-dual property.

Therefore, when an error occurs, because the inversion of the result of the operation performed on the inverted inputs may be output as the correct result of the operation, the cost and complexity required for error correction may be reduced.

Meanwhile, when an error signal is detected after the recomputation, whether a fault occurs in the adder unit 11 or the error indicator unit 12 of the self-checking binary signed-digit adder 10 is determined, whereby the location at which the fault occurs may be detected.

In order to detect the location at which the fault occurs, the erroneous result of the operation performed on the normal inputs (hereinafter, referred to as 'faulty output') is compared with the result of the operation performed on the inversed inputs (hereinafter, referred to as 'output for the inversed inputs') at step S5000.

Here, the comparison of the faulty output with the output for the inversed inputs is the process of comparing whether the bits of the faulty output are the same as the corresponding bits of the output for the inversed inputs.

Next, if no identical bits are present, that is, if the condition 'equalities=0' is satisfied, it is determined that there is no error in the result of the operation performed on the normal inputs. Accordingly, it is determined at step S5200 that the error indicator unit 12 has a fault.

However, if identical bits are present, it is determined at step S5300 that one or more faults occur in the error indicator unit 12 or the adder unit 11.

Meanwhile, if no error signal is detected in the process of detecting an error signal after recomputation at step S3000, it may be determined that there is no fault in the error indicator unit 11 but that there is a fault in the adder unit 11.

Accordingly, when no error signal is detected after the recomputation, the present invention may localize the fault in the adder unit 11.

Here, the present invention classifies the location at which the fault occurs into the following three types.

Type 1: a fault in any one of the outputs of the second adders ADD2s or in any one of the outputs of the first adders ADD1s, which causes a change of one bit in the final addition result.

Type 2: a fault in the LSB of any one of the inputs of the first adders ADD1s, which causes a change of two bits in the final addition result.

Type 3: a fault in the MSB of any one of the inputs of the first adders ADD1s, which causes a change of three bits in the final addition result.

Also, in order to localize the fault in the adder unit, first, the faulty output for the normal inputs is compared with the output for the inversed inputs at step S3100. Here, when the number of identical bits is one, that is, when the condition 'equalities=1' is satisfied, at step S6000, it is determined at step S6100 that a fault occurs at any one location among the above three possible fault locations.

However, if the number of identical bits is two, that is, if the condition 'equalities=2' is satisfied, at step S6200, it is determined at step S6300 that a fault occurs at the location of type 2 or type 3. Also, if the number of identical bits is three, that is, if the condition 'equalities=3' is satisfied, at step S6400, it is determined that the fault occurs at the location of type 3 at step S6500.

Therefore, according to the fault-localization and error-correction method of the present invention, when an error occurs, the error may be autonomously corrected by performing recomputation on the inversed inputs, and the location at which the fault occurs may be detected.

Figure 8:
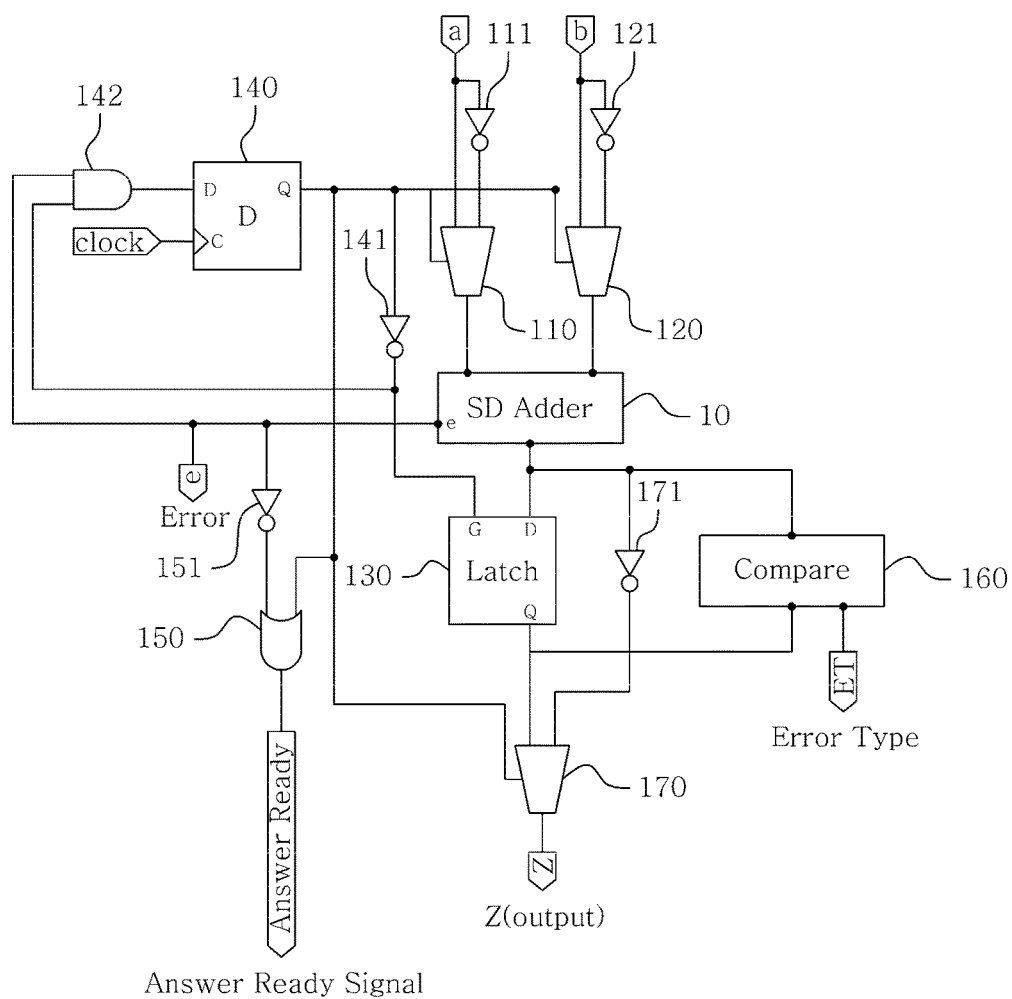
FIG. 8 is an example of a digital logic circuit for performing a fault-localization and error-correction method according to an embodiment of the present invention.

Also, FIG. 8 shows an example of a digital logic circuit for performing the fault-localization and error-correction method of the present invention.

The digital logic circuit 100 includes a first MUX 110 for receiving an addend 'a' and the inversion of the addend and selectively outputting one of the two received values, a second MUX 120 for receiving an augend 'b' and the inversion of the augend and selectively outputting one of the two received values, a first inversion gate 111 for inputting the inversion of the addend to the first MUX 110, a second inversion gate 121 for inputting the inversion of the augend to the second MUX 120, and a self-checking binary signed-digit adder 10 for receiving the values output from the first MUX 110 and the second MUX 120 and calculating the addition of the binary signed-digit numbers.

Also, the digital logic circuit 100 further includes a latch 130 for temporarily storing the result from the self-checking binary signed-digit adder 10, an AND gate 142 for receiving an error signal e of the self-checking binary signed-digit adder 10 and the inversion of a flip-flop 140 and performing an AND operation on the received values, and the flip-flop 140 for receiving a value output from the AND gate 142 and outputting '0' or '1'.

Also, the output of the flip-flop 140 is input to the first MUX 110 and the second MUX 120 as the selection signal thereof.

Also, the latch 130 uses the inversion of the output of the flip-flop 140 as the clock input thereof. Here, in order to invert the output of the flip-flop 140, a third inversion gate 141 is provided.

Also, the digital logic circuit 100 includes a comparator 160 for receiving the output of the self-checking binary signed-digit adder 10 and the output of the latch 130 and comparing the two input values.

Also, the comparator 160 serves to compare the faulty output with the output for the inverted inputs, and outputs information about the above-mentioned types.

Also, the digital logic circuit 100 includes a third MUX 170 for receiving the output of the latch 130 and the inversion of the output of the self-checking binary signed-digit adder 10 and selectively outputting one of the two received values. Here, the output of the flip-flop 140 is input to the third MUX 170 as the selection signal thereof.

That is, when an error occurs, the third MUX 170 outputs the inversion (the 1's complement) of the output for the inverted inputs as the result of the operation performed on the normal inputs, whereby the third MUX 170 serves to autonomously correct the error.

Also, the digital logic circuit 100 includes a fifth inversion gate 171 for inverting the output of the self-checking binary signed-digit adder 10 and inputting the inverted output to the third MUX 170.

Also, the digital logic circuit 100 may additionally include a fourth inversion gate 151 for inverting the error signal of the self-checking binary signed-digit adder 10 and an OR gate 150 for performing an OR operation on the output of the fourth inversion gate 151 and the output of the flip-flop 140 and outputting an answer-ready signal.

Meanwhile, the digital logic circuit 100 of the present invention is not limited to the logic circuit illustrated in FIG. 8, and may be modified into various forms of digital logic circuits capable of performing the fault-localization and error-correction method of the present invention.

The fault-localization and error-correction method and the digital logic circuit for performing the method of the present invention are advantageous in that a stuck-at fault of a self-checking binary signed-digit adder may be detected at low cost and with low complexity using the self-dual concept, and in that the error may be autonomously corrected.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fault-localization and error-correction method through a digital logic circuit for a self-checking binary signed-digit adder that is configured to receive an addend and an augend, which are signed-digit numbers, as input values, to perform an addition operation on the input values, and to output an error signal when an error occurs in the addition operation, the fault-localization and error-correction method comprising:

detecting the error signal in the self-checking binary signed-digit adder;

inputting a value (hereinafter, referred to as 'inverted inputs') acquired by computing a 1's complement of an input value (hereinafter, referred to as 'normal inputs') of the operation in which the error occurs to the self-checking binary signed-digit adder and performing recomputation on the inverted inputs; and determining whether an error signal is detected in the self-checking binary signed-digit adder after the recomputation, and performing fault localization and error correction depending on whether the error signal is detected.

2. The fault-localization and error-correction method of claim 1, further comprising, when no error signal is detected after the recomputation, outputting a 1's complement of a result of the operation performed on the inverted inputs as a result of the operation performed on the normal inputs.

3. The fault-localization and error-correction method of claim 1, wherein:
the self-checking binary signed-digit adder comprises an adder unit for performing an addition operation and an error indicator unit for detecting an error of the addition operation, and
the fault-localization and error-correction method further comprises
determining whether a fault occurs in the adder unit or in the error indication unit when the error signal is detected after the recomputation.

4. The fault-localization and error-correction method of claim 3, wherein the determining whether the fault occurs comprises:
comparing bits of a result (hereinafter, referred to as 'faulty output') of the operation performed on the normal inputs with corresponding bits of a result (hereinafter, referred to as 'output for the inverted inputs') of the operation performed on the inverted inputs; and
determining that one or more faults occur in the adder unit or in the error indicator unit when an identical bit is found to be present as a result of the comparing, and determining that a fault occurs in the error indicator unit when an identical bit is not found to be present as the result of the comparing.

5. The fault-localization and error-correction method of claim 4, further comprising,
when no error signal is detected after the recomputation, determining a location at which a fault occurs in the adder unit depending on a number of identical bits found as a result of the comparing the bits of the faulty output with corresponding bits of the output for the inverted inputs.

6. The fault-localization and error-correction method of claim 5, wherein:
the adder unit includes multiple first adders and multiple second adders arranged so as to correspond to the respective first adders, each of the first adders outputting a sum and a carry by adding a signed-digit of the addend and a signed-digit of the augend at an identical digit position, and each of the second adders outputting a final addition result of the addend and the augend by adding the sum output from the corresponding first adder and the carry output from the first adder, having added the signed-digit of the addend and the signed-digit of the augend at a previous digit position, and
the determining whether the fault occurs is configured such that when one identical bit is found as the result of the comparing the bits of the faulty output with the corresponding bits of the output for the inverted inputs, it is determined that the fault occurs in any one of outputs of the second adders, in any one of outputs of the first adders causing a change of one bit in the final addition result, in an LSB of any one of inputs of the first adders causing a change of two bits in the final addition result, or in an MSB of any one of the inputs of the first adders causing a change of three bits in the final addition result.

7. The fault-localization and error-correction method of claim 6, wherein the determining whether the fault occurs is configured such that when two identical bits are found as the result of the comparing the bits of the faulty output with the corresponding bits of the output for the inverted inputs, it is determined that the fault occurs in the LSB of any one of the inputs of the first adders causing a change of two bits in the final addition result or in the MSB of any one of the inputs of the first adders causing a change of three bits in the final addition result.

8. The fault-localization and error-correction method of claim 6, wherein the determining whether the fault occurs is configured such that when three identical bits are found as the result of the comparing the bits of the faulty output with the corresponding bits of the output for the inverted inputs, it is determined that the fault occurs in the MSB of any one of the inputs of the first adders causing a change of three bits in the final addition result.

* * * * *